United States Patent
Schoendube

[11] 3,819,965
[45] June 25, 1974

[54] COOLING SYSTEMS ESPECIALLY FOR DRY TYPE INDUCTION REGULATORS

[75] Inventor: Charles W. Schoendube, Hickory, N.C.

[73] Assignee: General Electric Company, Pittsfield, Mass.

[22] Filed: Nov. 20, 1972

[21] Appl. No.: 307,848

[52] U.S. Cl. .............................................. 310/58
[51] Int. Cl. .......................................... H02k 9/00
[58] Field of Search ............ 310/52, 58, 60, 53, 55, 310/59, 62, 63, 157, 89, 91; 336/100, 57, 60

[56] References Cited
UNITED STATES PATENTS

| | | | |
|---|---|---|---|
| 1,373,002 | 3/1921 | Hellmund | 310/58 |
| 2,469,820 | 5/1949 | Fuge | 310/58 |
| 2,610,992 | 9/1952 | Johns | 310/59 |
| 2,680,822 | 6/1954 | Brainard | 310/60 |
| 3,145,914 | 8/1964 | Nicholas | 310/63 |
| 3,478,689 | 11/1969 | Ball | 310/63 |
| 3,525,001 | 8/1970 | Erickson | 310/63 |
| 3,572,976 | 3/1972 | Sato | 310/63 |
| 3,643,119 | 2/1972 | Lukens | 310/60 |

*Primary Examiner* — R. Skudy
*Attorney, Agent, or Firm* — F. X. Doyle; Volker Ulbrich; John J. Kelleher

[57] ABSTRACT

An induction regulator is provided having cooling ducts on the exterior of the stator core. The ends of the rotor windings are spaced from the core and from the shaft to provide cooling ducts therebetween. An air deflector is provided at the upper end of the exterior cooling ducts to deflect cooling air through the stator winding and through the cooling ducts on the rotor windings, thereby cooling the ends of such windings. The lower ends of both the stator and rotor winding are cooled by the direct blast of cooling air from the cooling air chamber.

3 Claims, 3 Drawing Figures

COOLING SYSTEMS ESPECIALLY FOR DRY TYPE INDUCTION REGULATORS

BACKGROUND OF THE INVENTION

This invention relates to induction type electrical apparatus and more particularly to an induction regulator having an improved cooling system.

As is well known, an induction regulator consists essentially of a stator and rotor, each of which carry windings. The rotor of an induction regulator does not turn continuously as in an induction motor, but is adjusted relative to the stator so as to adjust the coupling between the windings. The adjustment between the windings thus regulates the voltage induced in one winding by the other. Both windings carry alternating current. As will be understood, the windings of a regulator become heated by such current and it is necessary to cool the windings to prevent injury to the regulator. The output of the regulator is limited by the heat of the winding. Thus, the better cooling possible the greater can be the output of the induction regulator. Of course, as will be understood, the same requirement for cooling is found in other types of electrical induction apparatus.

In prior art induction apparatus, forced air is directed at the lower end of the rotor and stator and then flows through the air gap between such rotor and stator to the top of the electrical apparatus. Only a limited amount of air can flow through such gap and such air is generally heated to the surface temperature of the rotor and stator prior to reaching the top of the apparatus. This prevents adequate cooling of the upper portion of the rotor and stator windings, thus limiting the output of the apparatus. Obviously, particularly with respect to induction regulators, it is desirable to improve such forced air cooling system to thereby increase the efficiency of such regulators.

It is, therefore, one object of this invention to provide an improved cooling system for induction apparatus.

A still further object of this invention is to provide additional cooling ducts at the end turns of the rotor windings to better cool such end turns.

A still further object of this invention is to provide an induction regulator with a more efficient, forced air cooling.

SUMMARY OF THE INVENTION

Briefly, in a preferred form of this invention, an induction regulator is provided with a forced air cooling chamber at the base thereof. Exterior cooling ducts are provided extending from the cooling chamber to the top of the regulator. Baffle means are provided in the cooling ducts to deflect the cooling air to the upper end turns of the rotor and stator windings. Openings are provided in the end turns of both the rotor and stator windings and additionally the rotor winding is spaced from the rotor shaft to provide additional cooling of the rotor and stator winding end turns.

The invention which is sought to be protected will be particularly pointed out and distinctly claimed in the claims appended hereto. However, it is believed that this invention and the manner in which its various objects and advantages are obtained, as well as other objects and advantages thereof, will be more clearly understood by reference to the following detailed description of a preferred embodiment thereof, especially when considered in the light of the accompanying drawings.

DESCRIPTION OF PREFERRED EMBODIMENT

Figure 1:
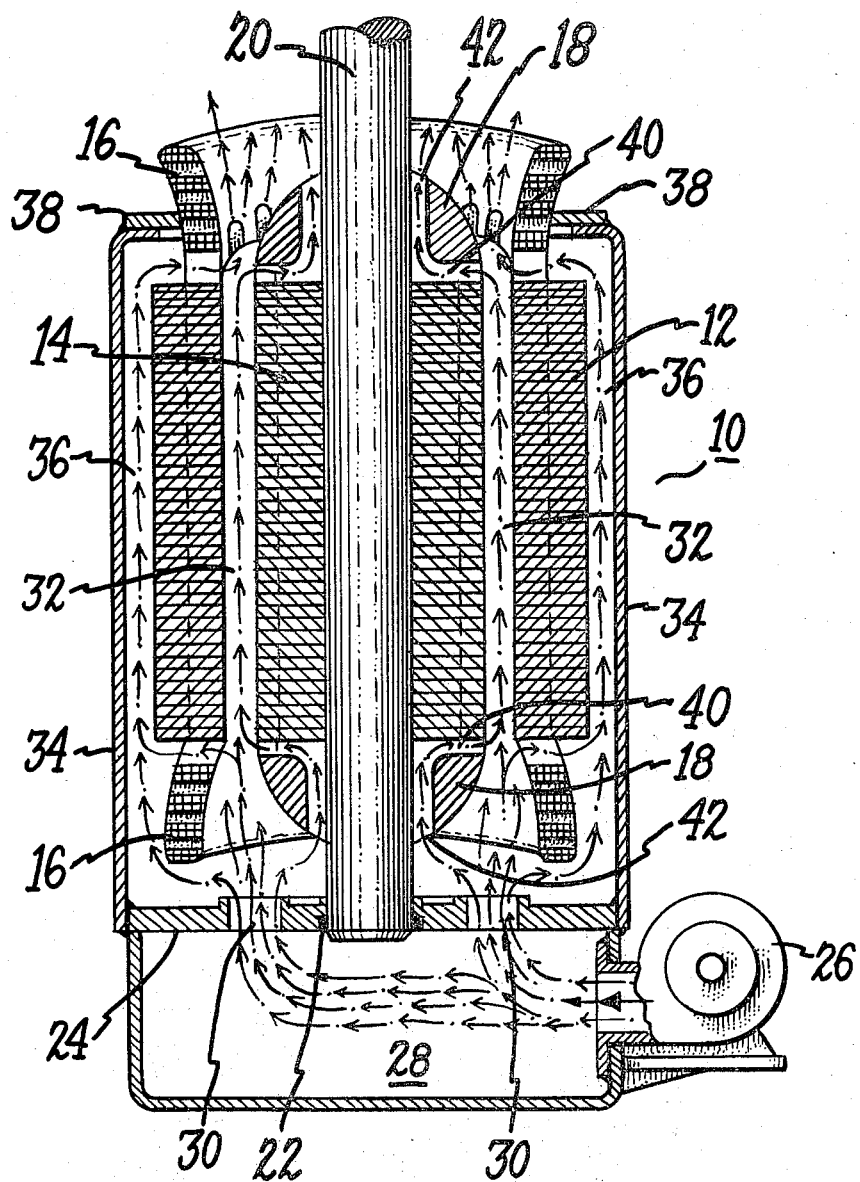
FIG. 1 is a sectional view of a forced air cooled induction regulator showing a preferred form of this invention.

This invention relates to improved cooling systems for induction devices, particularly induction regulators. Referring now to the drawings in which like numerals are used to indicate like parts throughout, and considering specifically FIG. 1, there is shown an induction regulator 10 having a stator 12 and a rotor 14. As will be readily understood by those skilled in the art, stator 12 is a stationery magnetic core member, shown in section, and being provided with stator winding 16, mounted in slots in the stator 12 (not shown). In a similar manner, rotor 14 is a rotatable magnetic core, also shown in section, having rotor windings 18 mounted in slots (not shown) in the rotor 14. As shown, the rotor 14 is rigidly mounted on shaft 20, while shaft 20 is rotatably mounted in bearings 22 in the lower end plate 24 of regulator 10. The upper end of shaft 20 is also mounted in bearing (not shown) and provided with means (not shown) which are well known to those skilled in the art, for adjusting the position of the rotor with respect to the stator. Thus, rotor 14 is axially rotatable within stator 12.

Regulator 10 is forced air cooled by means of pump 26 which forces air into an air chamber 28 which is fixed to the end plate 24. End plate 24 has a plurality of holes 30, which allow the air to be forced against the lower ends of the stator winding 16 and the rotor winding 18, as shown by the arrows. Also, an air passage 32 is provided between stator 12 and rotor 14 which is the normal air gap between such members.

In accordance with this invention, a housing or shroud 34 is provided secured to end plate 24, as shown. Housing 34 is spaced from the outer surface of stator 12 providing secondary air passages 36 for cooling air over the outer surface of stator 12. At the top of housing 34 an air deflector 38 is provided. Deflector 38 deflects the air flowing in secondary passages 36 through the normal openings in stator winding 16 as shown, cooling the ends of such stator windings. Thus, a plurality of high velocity jets of air are provided through the stator winding 16, mixing with and cooling the air from the main passage 32 and providing a blast of air at the top ends of rotor windings 18. To improve the cooling of rotor windings 18, the ends of the windings 18 are spaced from the core surfaces of rotor 14 and also from shaft 20, creating ducts 40 and 42 for air flow. This spacing of the windings from the core of rotor 14 and shaft 20 also provides for exposing more surfaces of both the rotor 14 and the rotor windings 18 to the cooling air.

As will be apparent from what has gone before, by means of this invention, secondary air passages 36 are provided on the exterior of the stator 12. Additionally, due to deflector 38, jets of cooling air are forced through the ends of stator winding 16 and into the ducts 40, 42 of the ends of rotor winding 18, cooling both rotor winding 18 and stator winding 16. By means of this invention, it is possible to greatly increase the Kva ratings of induction regulators. In the smaller sizes of induction regulators, the Kva rating has been substantially doubled.

Figure 3:
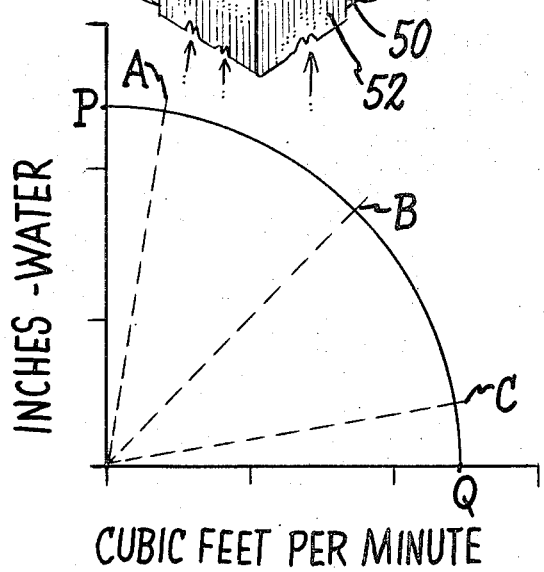
FIG. 3 is a graph showing the air flow at various pressures which may be obtained in electrical induction apparatus with and without this invention.

FIG. 3 is a graph of air pressure versus air flow indicating, in part, the reason for the increased Kva ratings. As shown in FIG. 3, the abscissa is pressure of air in inches of water, while the ordinate is the quantity of air in cubic feet per minute. As will be understood, the greatest cooling is provided by the largest quantity of air passing over the surface with the highest pressure possible. The three curves A, B and C indicate the quantity and pressure of air flowing out of the top of regulator 10 under the different conditions to be described. Curve A, very high pressure, with very small quantities is found when the air from chamber 28 is directed at the bottom of regulator 10 and end plate 24 is connected to stator 12, such that substantially all of the air from chamber 28 is forced through the primary air passage 32. Curve B is a showing of substantially high pressure air with substantially a large quantity of air. This curve is obtained with the construction shown in FIG. 1 of the drawing. Curve C shows very high quantity of air but very low pressures. This curve is obtained utilizing a construction such as is shown in FIG. 1 but with the air baffles or deflectors 38 removed. As can be seen, Curve B provides the better cooling since it optimizes both the pressure of the air and the quantity of air flowing through the various passages to provide cooling. Of course, it should also be understood that the cooling of the end turns of both the stator winding 16 and rotor winding 18 aid in obtaining the improved Kva rating for the given size of regulator. Of course, it will be understood from FIG. 1 of the drawing that the ducts 40 and 42 in the lower end turns of rotor winding 18 also provide additional cooling for the lower end turns of the rotor winding.

Figure 2:
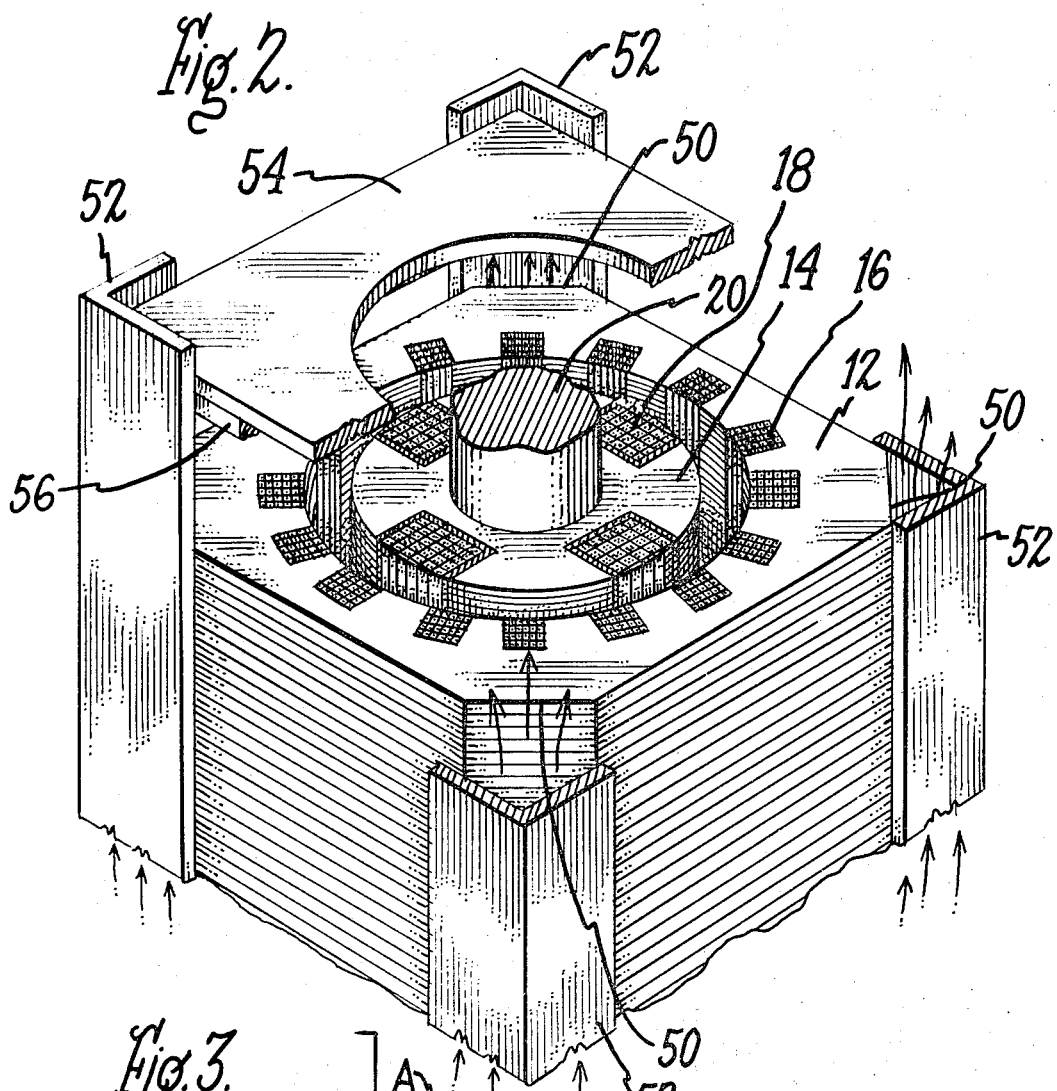
FIG. 2 is a partial, perspective view, with a portion in section, showing a modification of the air cooling system of this invention.

FIG. 2 is a partial perspective view of a modification of the invention and is shown as it would be applied to a specific type of induction regulator having a rectilinear stator core. As shown, the stator 12 is provided with stator winding 16 and rotor 14 is provided with rotor winding 18 as in FIG. 1. Rotor 14 is also fixed to rotatable shaft 20 in the same manner as in FIG. 1. In place of the shroud or housing 34 of FIG. 1, the corners 50 of the core of stator 12 are cut off at a diagonal as shown. Corner angles 52 are welded to these cut corners providing support for stator 12 and the end plates (not shown). As shown by the arrows, the angles 52 form natural air flow paths or ducts from the air chamber 28 (see FIG. 1) along a portion of the outer surface of stator 12. As will be understood, these air paths or ducts are in this instance the secondary air passages from the cooling chamber 28 to the upper portion of the regulator. A deflector 54 is provided, secured to angles 52, as shown in FIG. 2. If desired, bars 56 may be provided between the angles 52, for strengthening of the assembly. Deflectors 54 could then be secured to such bars, as by adhesive or other means. Of course, it will be understood that deflector 54 performs in substantially the same manner as deflector 38 of FIG. 1.

While there has been shown and described the present preferred embodiment of this invention, it will, of course, be understood by those skilled in the art that various modifications may be made therein. It is to be understood that the invention to be secured includes all such changes and modifications as fall within the spirit and scope of the invention as is set forth in the appended claims.

What is claimed as new and which it is desired to secure by Letters Patent of the United States is:

1. An induction type electrical apparatus having a stator with windings mounted therein and a rotor having windings and secured to a shaft for axially rotating within said stator, an air chamber having a pump for forcing cooling air through said induction apparatus, cooling ducts provided on the exterior of said stator and communicating with said air chamber, baffle means at the upper end of said cooling ducts for directing jets of air across the end turns of said stator winding and said rotor winding, said end turns of said rotor winding spaced from said rotor and said shaft to provide cooling ducts therebetween, and said exterior cooling ducts formed by a housing surrounding said stator.

2. An induction apparatus as set forth in claim 1 in which said stator is rectilinear in shape, with the corners thereof being cut on a diagonal and angles welded thereto, said angles forming said exterior cooling ducts.

3. An induction regulator having a stator with windings mounted therein, a rotor having windings and secured to a shaft and axially mounted for rotation within said stator, a primary cooling passage formed by the air gap between said stator and said rotor, an air chamber, having a pump, fixed to an end plate at one end of said induction regulator, secondary cooling passages formed on the exterior of said stator and communicating at one end with said air chamber, air deflector means mounted on the other end of said secondary cooling passages for deflecting cooling air from said air chamber across the end turns of said stator and said rotor windings, said rotor windings being spaced from said rotor and said shaft to provide cooling ducts therebetween, and said secondary cooling passages formed by angles which are secured to the core of said stator, said stator core being rectilinear in shape with the corners of said core being cut at a diagonal and said angles welded thereto.

* * * * *